(12) United States Patent
Fadell et al.

(10) Patent No.: US 9,851,699 B2
(45) Date of Patent: Dec. 26, 2017

(54) COMPONENT INTERFACING IN HAZARD SAFETY SYSTEMS

(71) Applicant: GOOGLE LLC, Mountain View, CA (US)

(72) Inventors: Anthony Michael Fadell, Portola Valley, CA (US); Scott Mullins, Gilroy, CA (US); Brian Jonathan Conner, San Jose, CA (US); Ian C. Smith, Palo Alto, CA (US)

(73) Assignee: GOOGLE LLC, Mountain View, CA (US)

( * ) Notice: Subject to any disclaimer, the term of this patent is extended or adjusted under 35 U.S.C. 154(b) by 514 days.

(21) Appl. No.: 14/334,159

(22) Filed: Jul. 17, 2014

(65) Prior Publication Data

US 2015/0022346 A1 Jan. 22, 2015

Related U.S. Application Data

(60) Provisional application No. 61/847,949, filed on Jul. 18, 2013.

(51) Int. Cl.
*G08B 1/08* (2006.01)
*G05B 11/01* (2006.01)
*G08B 25/04* (2006.01)
*G08B 29/06* (2006.01)

(52) U.S. Cl.
CPC .............. *G05B 11/01* (2013.01); *G08B 25/04* (2013.01); *G08B 29/06* (2013.01)

(58) Field of Classification Search
CPC .......... G05B 11/01; G08B 25/04; G08B 29/06
USPC ................................ 340/533, 506, 507, 511
See application file for complete search history.

(56) References Cited

U.S. PATENT DOCUMENTS

| | | | | |
|---|---|---|---|---|
| 5,708,424 A | * | 1/1998 | Orlando | ............... H04M 11/002 340/618 |
| 8,847,772 B2 | | 9/2014 | Marks et al. | |
| 2005/0010323 A1 | * | 1/2005 | Cocciadiferro | ....... B29B 7/7663 700/174 |
| 2010/0042855 A1 | * | 2/2010 | Karam | .................... H04L 12/10 713/310 |

* cited by examiner

*Primary Examiner* — Daryl Pope
(74) *Attorney, Agent, or Firm* — Van Court & Aldridge LLP (57) ABSTRACT

Systems and methods for interfacing a hazard detection device with a control panel system via a dongle are provided. The dongle may be configured to alternate between drawing first and second amounts of power from the control panel system in response to the hazard detection device alternating between operating in a normal mode when no hazard is detected and an alarm mode when a hazard is detected. The hazard detection device may operate independently of any characteristics of the control panel system. For example, the hazard detection device may operate without drawing any power from the control panel system. Therefore, the dongle may allow for various types of hazard detection devices to interface with a common two-line power control system.

43 Claims, 4 Drawing Sheets

COMPONENT INTERFACING IN HAZARD SAFETY SYSTEMS

CROSS-REFERENCE TO A RELATED APPLICATION

This patent application claims priority to U.S. Provisional Patent Application No. 61/847,949, filed Jul. 18, 2013, the disclosure of which is incorporated by reference in its entirety.

TECHNICAL FIELD

This disclosure relates to systems and methods for interfacing a hazard detection device with a control panel system and, more particularly, to systems and methods for interfacing a hazard detection device with a control panel system via a dongle.

BACKGROUND

Hazard safety systems, which may include one or more hazard detection devices (e.g., smoke detectors, carbon monoxide detectors, motion detectors, etc.) electrically coupled to a control panel via one or more wires of a control panel system, can be used in residential, commercial, and industrial settings to detect and warn of hazardous conditions for safety considerations. Sometimes, such control panel systems may be referred to as security panel systems or central panel systems. One known control panel system may be configured to be interfaced with each hazard detection device of a hazard safety system in such a way that each hazard detection device is powered by power provided over the wires of the control panel system from the control panel, and may further be configured to be interfaced with each hazard detection device in such a way that the hazard detection device pulls more power from the control panel system when the device changes from a normal mode of operation to an alarm mode of operation in response to detecting a hazardous condition. This increase in power drawn by the hazard detection device alerts the control panel of the control panel system that a hazardous condition exists in the hazard safety system.

As hazard detection devices advance to perform features in addition to sensing for hazards (e.g., to wirelessly communicate with remote devices), additional demands for power are needed by the advanced hazard detection devices. Issues may arise in the interfacing of such advanced hazard detection devices with control panel systems such as those described above in which increased power draw serves as an alerting mechanism. In particular, issues may arise in that an increased power draw by an advanced hazard detection device may be incorrectly interpreted by the control panel as an existing hazardous condition. Other issues arise as would be apparent to a person skilled in the art in view of the instant disclosure.

SUMMARY

Systems and methods for interfacing a hazard detection device with a control panel system via a dongle are provided.

A dongle may be provided to interface between a hazard detection device and a control panel system such that a mode of the hazard detection device may be properly monitored by the control panel system via the dongle. For example, in order for a control panel to monitor a string of one or more hazard detection devices coupled to a control panel system, the control panel system may require a hazard detection device pull a first amount of power from the system when that hazard detection device is in its normal mode of operation (e.g., when the hazard detection device is not detecting a hazardous condition) and, conversely, the control panel system may require a hazard detection device pull a second amount of power from the system when that hazard detection device is in its alarm mode of operation (e.g., when the hazard detection device is detecting a hazardous condition). These first and second amounts of pulled power may be certain first and second ranges of pulled power that the control panel may be configured to detect in order for the control panel to determine when a hazard detection device has switched from a normal mode to an alarm mode. However, some hazard detection devices are configured to operate outside of one or more of these power ranges and, therefore, may not be suitable for interfacing directly with the control panel system. A dangle interfaced between the control panel system and a hazard detection device may be configured to alternate between drawing these first and second amounts of power from the control panel system in response to the dongle detecting that its interfaced hazard detection device is alternating between operating in a normal mode and an alarm mode.

In some embodiments, the dongle may be configured to allow the interfaced hazard detection device to operate independently of any characteristics of the control panel system. For example, the dongle may allow its interfaced hazard detection device to draw no power from the control panel system, and instead the dongle itself may draw the proper amount of power from the control panel system in order to communicate the current mode of its interfaced hazard detection device to the control panel. Therefore, the dongle may allow for various types of hazard detection devices to interface with the control panel system.

The dongle may be provided with a dongle module that may be configured to pull a specific amount of power from the control panel system despite variations in the electric potential provided by the control panel system to the dongle. For example, the dongle module may include a constant current sink that, when enabled, may be configured to draw a specific amount of current from the control panel system, despite the control panel system being able to provide an electric potential to the dongle that may vary (e.g., between 6 volts and 33 volts). The dongle may receive a control signal from an interfaced hazard detection device that may either enable or disable the dongle module from pulling a certain amount of power from the control panel system. The hazard detection device may transmit a first control signal to the dongle for disabling the dongle module from pulling power from the control panel system when the hazard detection device does not detect a hazard and is in a normal mode of operation, and the hazard detection device may transmit a second control signal to the dongle for enabling the dongle module to pull a certain amount of power from the control panel system when the hazard detection device does detect a hazard and is in an alarm mode of operation.

In one embodiment, a dongle can interface a control panel system with a hazard detection device. The control panel system can include a control panel and at least one wired detection string, and the control panel monitors a current level provided to each wired detection string to determine whether an alarm condition exists on the at least one wired detection string. The hazard detection device can be of a type that would cause a false alarm condition to exist for the wired detection string if it were directly electrically coupled to that wired detection string. The dongle can include a first connector configured to be electrically coupled to a wired detection string of the control panel system, and a second connector configured to be electrically coupled to the hazard detection device. The dongle includes a first module configured to receive a control signal from the hazard detection device via the second connector. The first module can pull a first amount of current from the control panel system via the first connector when the received control signal is a first value, the first amount of current having a current level that does not indicate an alarm condition exists on the wired detection string. The first module can pull a second amount of current from the control panel system via the first connector when the received control signal is a second value, the second amount of current having a current level that does indicate an alarm condition exists on the wired detection string.

In another embodiment, a hazard safety system can include a control panel system, a first hazard detection device, and a dongle. The control panel system can include a control panel and a plurality of wires electrically coupled to the control panel. The dongle can include a first dongle connector electrically coupled to at least a first wire of the plurality of wires, a second dongle connector electrically coupled to at least a first pin of the first hazard detection device, and a dongle module. The dongle module can be configured to receive a control signal from the first hazard detection device via the second dongle connector, and based on a value of the received control signal, vary an amount of power that the dongle module pulls from the first wire via the first dongle connector.

In another embodiment, a hazard detection device that interfaces with a dongle is provided. The hazard detection device can include a sensor configured to detect a characteristic of an environment, a processor configured to process the detected characteristic, and a power supply configured to power at least one of the sensor and the processor. The hazard detection device also includes a device connector configured to be electrically coupled to a dongle connector. The device connector can include a first device pin configured to be electrically coupled to a first dongle pin. The processor is configured to transmit a first control signal to the first device pin when the processor determines that the detected characteristic satisfies a first requirement. The processor is further configured to transmit a second control signal to the first device pin when the processor determines that the detected characteristic does not satisfy the first requirement.

In another embodiment, a method for operating a dongle is provided. The dongle can include a first connector and a second connector. The method can include the steps of receiving a control signal from a hazard detection device at the second connector of the dongle, and controlling an amount of power that is pulled from a control panel system via the first connector of the dongle. The amount of power pulled is based on the value of the received control signal.

In another embodiment, a method for operating a hazard detection device is provided. The method can include steps of detecting a characteristic of an environment with the hazard detection device, when the detected characteristic satisfies a first requirement, transmitting a first control signal from the hazard detection device to a module of a dongle, and when the detected characteristic does not satisfy the first requirement, transmitting a second control signal from the hazard detection device to the module of the dongle.

A further understanding of the nature and advantages of the embodiments discussed herein may be realized by reference to the remaining portions of the specification and the drawings.

BRIEF DESCRIPTION OF THE DRAWINGS

The above and other aspects of the disclosure, its nature, and various features will become more apparent upon consideration of the following detailed description, taken in conjunction with the accompanying drawings, in which like reference characters refer to like parts throughout, and in which.

DETAILED DESCRIPTION

In the following detailed description, for purposes of explanation, numerous specific details are set forth to provide a thorough understanding of the various embodiments. Those of ordinary skill in the art will realize that these various embodiments are illustrative only and are not intended to be limiting in any way. Other embodiments will readily suggest themselves to such skilled persons having the benefit of this disclosure.

In addition, for clarity purposes, not all of the routine features of the embodiments described herein are shown or described. One of ordinary skill in the art would readily appreciate that in the development of any such actual embodiment, numerous embodiment-specific decisions may be required to achieve specific design objectives. These design objectives will vary from one embodiment to another and from one developer to another. Moreover, it will be appreciated that such a development effort might be complex and time-consuming but would nevertheless be a routine engineering undertaking for those of ordinary skill in the art having the benefit of this disclosure.

Systems and methods for interfacing a hazard detection device with a control panel system via a dongle are provided and described with reference to FIGS. 1-5.

Figure 1:
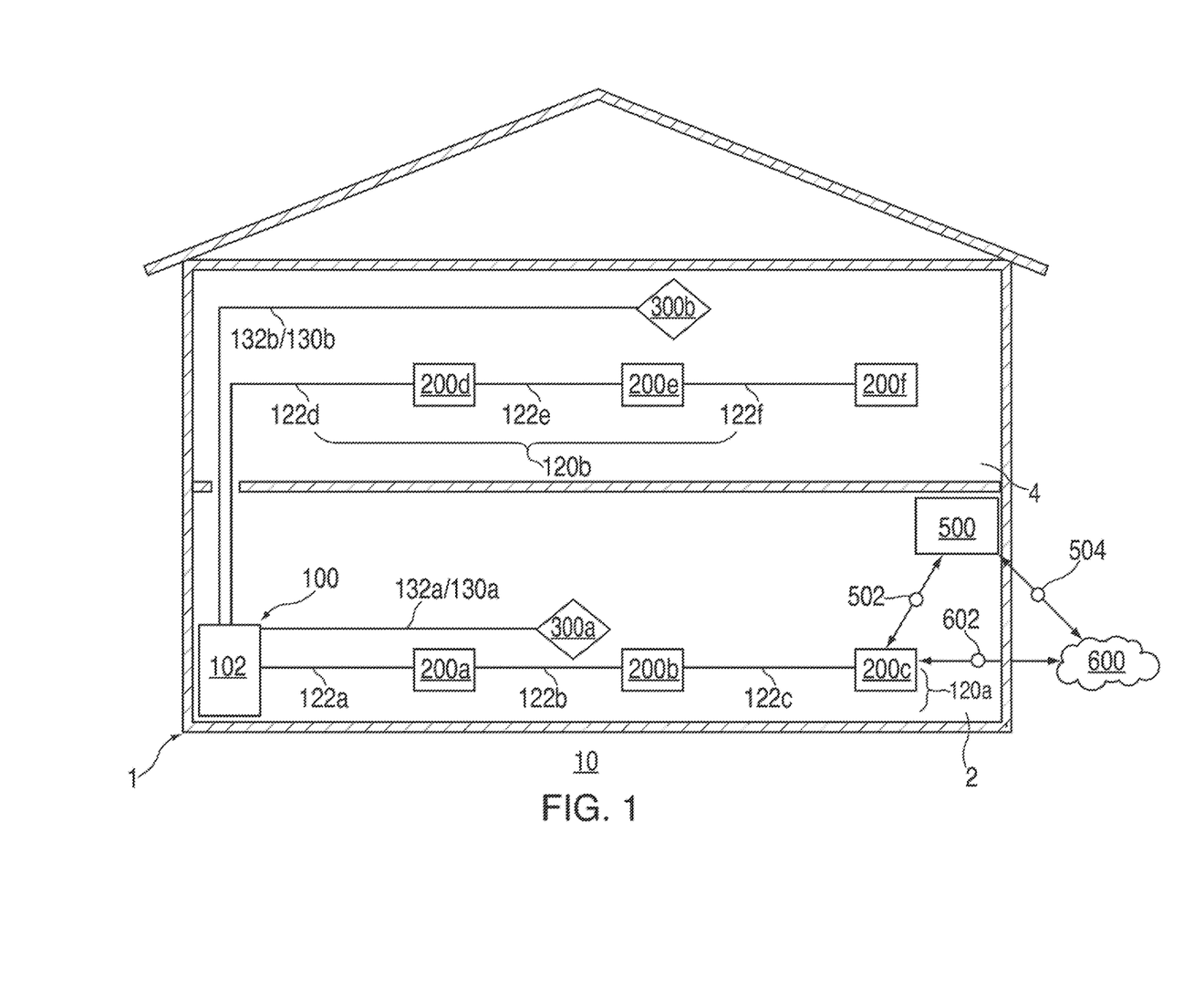
FIG. 1 is a diagram of an enclosure equipped with a hazard safety system, according to some embodiments.

FIG. 1 is a diagram illustrating an exemplary enclosure 1 that may be equipped with a hazard safety system 10 to detect and warn of hazardous conditions within enclosure 1 for safety considerations. Enclosure 1 may be any suitable structure (e.g., a residential home, a commercial building, etc.) that may benefit from having its environment monitored for hazardous conditions. Hazard safety system 10 may include a control panel system 100, one or more hazard detection devices 200 (e.g., hazard detection devices 200*a*-200*f*), and one or more hazard alarm devices 300 (e.g., hazard alarm devices 300*a* and 300*b*). Control panel system 100 may include a control panel 102, one or more wired detection strings 120 (e.g., wired detection strings 120*a* and 120*b*) for electrically coupling control panel 102 with each hazard detection device 200 of hazard safety system 10, and one or more wired alarm strings 130 (e.g., wired alarm strings 130a and 130b) for electrically coupling control panel 102 with each hazard alarm device 300 of hazard safety system 10. Each wired detection string 120 of control panel system 100 may include one or more wired detection segments 122 (e.g., wired detection segments 122a-122f) for coupling different groupings of hazard detection devices 200 to control panel 102, and each wired alarm string 130 of control panel system 100 may include one or more wired alarm segments 132 (e.g., wired alarm segments 132a and 132b) for coupling different groupings of hazard alarm devices 300 to control panel 102.

Each hazard detection device 200 may be any suitable device configured to detect one or more hazardous conditions (e.g., smoke, carbon monoxide, etc.) and to communicate that detection to control panel 102 via one of wired detection strings 120. In some embodiments, a hazard detection device 200 may be configured to detect any other suitable condition, such as motion or light (e.g., with a passive infrared detector). Each hazard alarm device 300 may be any suitable device configured to warn of a hazard (e.g., a strobe light, a loud speaker, etc.) when instructed to do so by control panel 102 via one of wired alarm strings 130. Control panel 102 may be any suitable component configured to sense, via one of wired detection strings 120, that a hazard detection device 200 has detected a hazardous condition. Control panel 102 may also be any suitable component configured to instruct a hazard alarm device 300, via one of wired alarm strings 130, to warn of a hazard. Control panel 102 may include a power supply 108 (e.g., a battery or line powered source) and a processor 110 (see, e.g., FIG. 2).

With continued reference to FIG. 1, enclosure 1 may be segmented by different zones (e.g., a first floor zone 2 and a second floor zone 4), and different wired detection strings 120 may electrically couple different hazard detection devices 200 within the different zones of enclosure 1, while, similarly, different wired alarm strings 130 may electrically couple different hazard alarm devices 300 within different zones of enclosure 1. For example, as shown, first wired detection string 120a may include wired detection segments 122a-122c that may electrically couple each one of hazard detection devices 200a-200c to control panel 102 within first floor zone 2, while first wired alarm string 130a may include wired alarm segment 132a that may electrically couple hazard alarm device 300a to control panel 102 within first floor zone 2. Therefore, whenever any of hazard detection devices 200a-200c changes from a normal mode to an alarm mode in response to detecting a hazardous condition in first floor zone 2, control panel 102 may be configured not only to detect this change via one or more of wired detection segments 122a-122c of first wired detection string 120a but then also to activate hazard alarm device 300a of first floor zone 2 with one or more control signals via wired alarm segment 132a of first wired alarm string 130a. Similarly, as also shown, second wired detection string 120b may include wired detection segments 122d-122f that may electrically couple each one of hazard detection devices 200d-200f to control panel 102 within second floor zone 4, while second wired alarm string 130b may include wired alarm segment 132b that may electrically couple hazard alarm device 300b to control panel 102 within second floor zone 4. Therefore, whenever any of hazard detection devices 200d-200f changes from a normal mode to an alarm mode in response to detecting a hazardous condition in second floor zone 4, control panel 102 may be configured not only to detect this change via one or more of wired detection segments 122d-122f of second wired detection string 120b but then also to activate hazard alarm device 300b of second floor zone 4 with one or more control signals via wired alarm segment 132b of second wired alarm string 130b.

Figure 2:
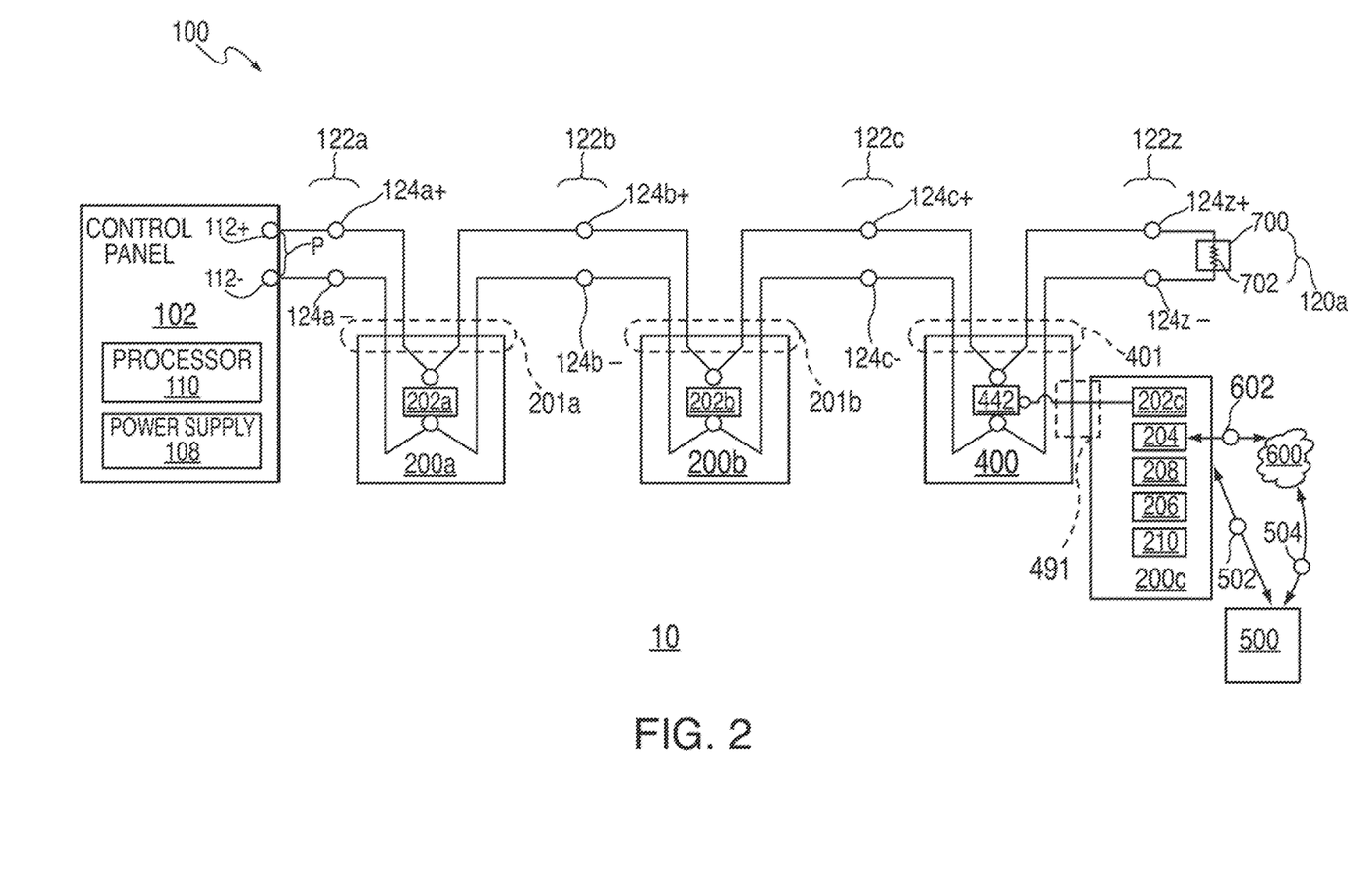
FIG. 2 is a schematic view of a portion of the hazard safety system of FIG. 1, according to some embodiments.

As mentioned, each hazard detection device 200 of hazard safety system 10 may be configured to detect any suitable hazard. For example, as shown in FIG. 2, each one of hazard detection devices 200a-200c may include any suitable hazard detection sensor 202 (e.g., hazard detection sensors 202a-202c, respectively) that may be configured to detect any suitable hazard, such as smoke or carbon monoxide. However, certain hazard detection devices 200 of hazard safety system 10 may be more advanced than others. For example, as also shown in FIG. 2, hazard detection devices 200a and 200b may only include a hazard detection sensor 202 (e.g., sensors 202a and 202b, respectively), while hazard detection device 200c may be an advanced hazard detection device that may include not only a hazard detection sensor 202c but also one or more additional components that may distinguish advanced hazard detection device 200c from hazard detection devices 200a and 200b in one or more ways. In some embodiments, as described in more detail below with respect to FIG. 3, along with sensor 202c, advanced hazard detection device 200c may also include communications circuitry 204, an alarm 206, a power supply 208, and/or a processor 210, while neither hazard detection device 200a nor hazard detection device 200b may include any one of communications circuitry, an alarm, a power supply, or a processor. For example, additional details of an advanced hazard detection system can be found in commonly assigned U.S. Publication No. 2015/0022349 and U.S. Pat. No. 9,412,258.

Control panel system 100 may be configured to provide an electric potential (e.g., DC power) across at least two wires 124 within one or more wired detection segments 122 of first wired detection string 120a. For example, wired detection segment 122a may extend between control panel 102 and hazard detection device 200a. More particularly, in some embodiments, a first wire 124a+ of wired detection segment 122a may extend between a first terminal 112+ of control panel 102 and a connector 201a of hazard detection device 200a, while a second wire 124a− of wired detection segment 122a may extend between a second terminal 112− of control panel 102 and connector 201a of hazard detection device 200a. Control panel 102 may be configured to provide an electric potential P across wires 124a+ and 124a− (e.g., using power supply 108 of control panel 102). Electric potential P supplied by control panel 102 may be any suitable potential, including a DC voltage, which may range from 6 volts to 33 volts in different embodiments. In some particular embodiments, electric potential P may be 12 volts (DC).

Control panel system 100 may be configured to provide enough power for powering one or more hazard detection devices 200 of hazard safety system 10. For example, as shown in FIG. 2, electric potential P provided by wires 124a+ and 124a− of wired detection segment 122a may be connected to connector 201a of hazard detection device 200a, which may be configured to apply electric potential P across sensor 202a of hazard detection device 200a. In doing so, electric potential P may provide enough power to hazard detection device 200a for powering sensor 202a.

In some embodiments, sensor 202a of hazard detection device 200a may be configured to pull a first amount of power from electric potential P when sensor 202a is in a normal mode of operation (e.g., when sensor 202a is sensing no hazardous material) and to pull a second amount of power from electric potential P when sensor 202a is in an alarm mode of operation (e.g., when sensor 202a is sensing a hazardous material). For example, hazard detection device 200a may be configured to pull 100 microamperes from electric potential P when sensor 202a is in a normal mode of operation, yet may be configured to pull 50 milliamperes from electric potential P when sensor 202a is in an alarm mode of operation (e.g., by shunting a resistor within hazard detection device 200a between wires 124a+ and 124a− of wired detection segment 122a). Such an increase in the amount of power being pulled from electric potential P by hazard detection device 200a may be detected on one or both of wires 124a+ and 124a− of wired detection segment 122a by control panel 102 at one or both of terminals 112+ and 112− (e.g., using processor 110 of control panel 102). For example, processor 110 of control panel 102 may be configured to determine that a hazardous condition has been detected along first wired detection string 120a when processor 110 detects a specific increase in power being pulled by first wired detection string 120a (e.g., when more than 40 milliamperes but less than 100 milliamperes are pulled). Therefore, control panel system 100 may provide all the power that hazard detection device 200a may need to function properly in each of its normal and alarm modes of operation. Moreover, hazard detection device 200a may communicate which mode of operation it is in to control panel 102 by pulling different amounts of power from first wired detection string 120a.

One or more additional hazard detection devices 200 may be coupled to and powered by control panel system 100 along first wired detection string 120a. For example, as shown in FIG. 2, wired detection segment 122b may be electrically coupled to wired detection segment 122a such that electric potential P may be available to connector 201b of hazard detection device 200b, which may be configured to apply electric potential P across sensor 202b of hazard detection device 200b. Particularly, as shown, a first end of each one of wires 124b+ and 124b− of wired detection segment 122b may be respectively coupled (e.g., shorted) to wires 124a+ and 124a− of wired detection segment 122a (e.g., by connector 201a of hazard detection device 200a), while a second end of each one of wires 124b+ and 124b− of wired detection segment 122b may be coupled to connector 201b of hazard detection device 202b. In doing so, electric potential P may provide enough power to hazard detection device 200b for powering sensor 202b.

In some embodiments, sensor 202b of hazard detection device 200b may be configured to pull a first amount of power from electric potential P when sensor 202b is in a normal mode of operation (e.g., when sensor 202b is sensing no hazardous material) and to pull a second amount of power from electric potential P when sensor 202b is in an alarm mode of operation (e.g., when sensor 202b is sensing a hazardous material). For example, hazard detection device 200b may be configured to pull 100 microamperes from electric potential P when sensor 202b is in a normal mode of operation, yet may be configured to pull 50 milliamperes from electric potential P when sensor 202b is in an alarm mode of operation (e.g., by shunting a resistor within hazard detection device 200b between wires 124b+ and 124b− of wired detection segment 122b). Such an increase in the amount of power being pulled from electric potential P by hazard detection device 200b may be detected on one or both of wires 124b+ and 124b− of wired detection segment 122b (e.g., via wired detection segment 122a) by control panel 102 at one or both of terminals 112+ and 112−. Therefore, control panel system 100 may provide all the power that hazard detection device 200b may need to function properly in each of its normal and alarm modes of operation. Moreover, hazard detection device 200b may communicate which mode of operation it is in to control panel 102 by pulling different amounts of power from first wired detection string 120a.

Figure 3:
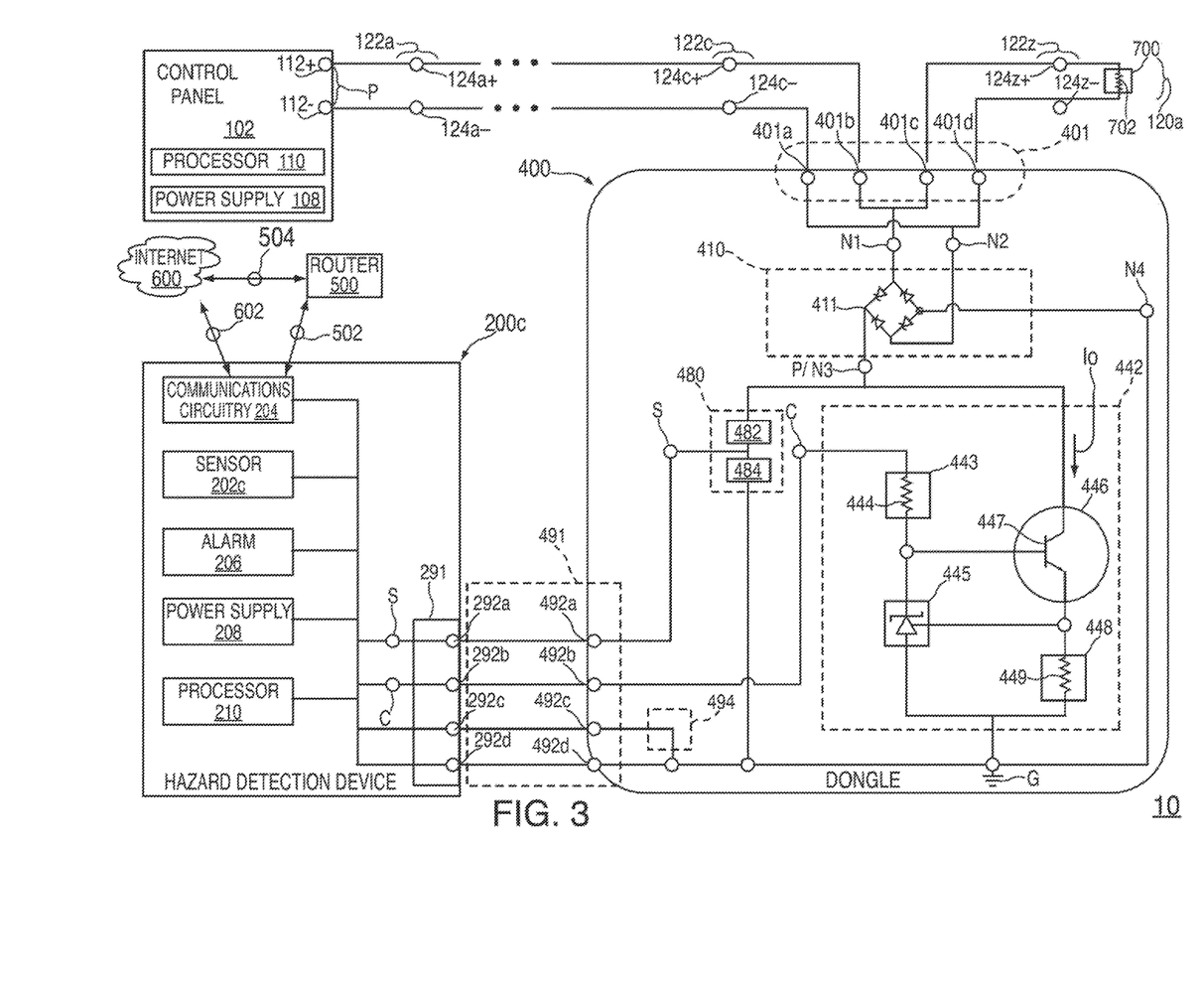
FIG. 3 is a more detailed schematic view of a portion of the hazard safety system of FIGS. 1 and 2, according to some embodiments.

Even more additional hazard detection devices 200, such as hazard detection device 200c, may be coupled to and powered by control panel system 100 along first wired detection string 120a. However, as mentioned, hazard detection device 200c may be an advanced hazard detection device 200 with one or more additional components that may distinguish advanced hazard detection device 200c from hazard detection devices 200a and 200b in one or more ways. For example, as shown in FIGS. 2 and 3, unlike hazard detection devices 200a and 200b, which may be fully powered by control panel system 100, advanced hazard detection device 200c may include its own power supply 208. In such embodiments, sensor 202c of advanced hazard detection device 200c may be configured to draw power from its own power supply 208, and therefore advanced hazard detection device 200c may not be configured to pull specific different amounts of power from control panel system 100 when sensor 202c changes between its normal and alarm modes of operation. Thus, advanced hazard detection device 200c may not be coupled to and powered by control panel system 100 in the same way as hazard detection devices 200a and 200b. Moreover, even if control panel system 100 were able to provide enough power to operate advanced hazard detection device 200c, advanced hazard detection device 200c may require a certain amount of power to operate in its normal mode of operation (e.g., non-alarm mode of operation) that may be greater than the amount of power that may be pulled by less-advanced hazard detection device 200a when operating in its normal mode of operation. For example, the amount of power that may need to be pulled by advanced hazard detection device 200c in its normal mode of operation may be substantially similar to or greater than the amount of power that may need to be pulled by less-advanced hazard detection device 200a in its alarm mode of operation, such that control panel 102 may be unable to differentiate between device 200c in normal mode and device 200a in alarm mode. Such a situation would prevent control panel 102 from being able to properly monitor each device 200 on first wired detection string 120a for a hazardous condition.

In order to allow for advanced hazard detection device 200c to communicate appropriately with control panel system 100 of hazard safety system 10, a dongle 400 may be interfaced between hazard detection device 200c and first wired detection string 120a of control panel system 100. Dongle 400 may be any suitable component that may be configured to pull a first amount of power from control panel system 100 when advanced hazard detection device 200c is in a normal mode of operation and that may be configured to pull a second amount of power from control panel system 100 when advanced hazard detection device 200c is in an alarm mode of operation. Dongle 400 may be configured such that these first and second amounts of power may match the power thresholds that control panel 102 of control panel system 100 may be configured to use in order to distinguish between whether non-hazardous conditions or hazardous conditions are being detected along first wired detection string 120a.

As shown in FIG. 2, wired detection segment 122c may be electrically coupled to wired detection segment 122b such that electric potential P may be available to a first dongle connector 401 of dongle 400, which may be configured to apply electric potential P across a dongle module 442 of dongle 400. Particularly, as shown, a first end of each one of wires 124c+ and 124c− of wired detection segment 122c may be respectively coupled (e.g., shorted) to wires 124b+ and 124b− of wired detection segment 122b (e.g., by connector 201b of hazard detection device 200b), while a second end of each one of wires 124c+ and 124c− of wired detection segment 122c may be connected to first dongle connector 401 of dongle 400. In doing so, electric potential P may provide enough power to dongle 400 for powering dongle 400, at least during a first mode of operation of dongle module 442. First dongle connector 401 may include any suitable number of terminals, such as terminals 401a-401d for connecting to control panel system 100.

In some particular embodiments, as shown in FIG. 3, a full bridge module 410 may be provided between electric potential P at first dongle connector 401 and electric potential P at dongle module 442. Full bridge module 410 may ensure that electric potential P provided as the bias to dongle module 442 at a node N3 is of a constant polarity, even when wires 124c+ and 124c− of wired detection segment 122c are coupled to the opposite terminals of first dangle connector 401. Full bridge module 410 may ensure that dongle module 442 is provided at node N3 with an electric potential of a polarity conducive to the functionality of dongle module 442 when wired detection segment 122c is connected to first dongle connector 401 as shown with wire 124c− coupled to dongle connector terminal 401a (and thus node N2) and wire 124c+ coupled to dongle connector terminal 401b (and thus node N1), or vice versa. As shown, full bridge module 410 may include a full diode bridge 411, although any other suitable circuitry may be provided by full bridge module 410. A first output of full bridge module 410 at node N3 may be provided as an electric potential bias to dongle module 442 (e.g., an electric potential close to that across wires 124c+ and 124c−, which may be close or equal to electric potential P), and a second output of full bridge module 410 at node N4 may be coupled to a common ground terminal G of dongle 400. Ground terminal G may be the ground reference for all circuitry on dongle 400 and, as described below, may be shorted to a ground terminal on advanced hazard detection device 200c.

As shown in FIG. 3, one or more pins 292 (e.g., pins 292a-292d) of a device connector 291 of advanced hazard detection device 200c may be electrically coupled to one or more pins 492 (e.g., pins 492a-492d) of a second dongle connector 491 of dongle 400, such that a control signal C indicative of the mode of operation of sensor 202c of advanced hazard detection device 200c may be communicated from advanced hazard detection device 200c to dongle module 442 of dongle 400 (e.g., via pins 292b and 492b). Dongle module 442 may be configured to change its mode of operation based on a variable value of control signal C. This may enable dongle module 442 to appropriately pull different amounts of power from control panel system 100 based on the value of control signal C and, thus, in response to the behavior of sensor 202c of advanced hazard detection device 200c. For example, in some embodiments, dongle module 442 of dongle 400 may be configured to pull a first amount of power from control panel system 100 when dongle module 442 is in a first mode of operation (e.g., when sensor 202c of advanced hazard detection device 200c is in a normal mode of operation and is sensing no hazardous material and, therefore, transmits a control signal C of a first value to dongle module 442 via second dongle connector 491). Moreover, in some embodiments, dongle module 442 of dongle 400 may be configured to pull a second amount of power from control panel system 100 when dongle module 442 is in a second mode of operation (e.g., when sensor 202c of advanced hazard detection device 200c is in an alarm mode of operation and is sensing hazardous material and, therefore, transmits a control signal C of a second value to dongle module 442 via second dongle connector 491).

Dongle module 442 may be any suitable module configured to pull different amounts of power from control panel system 100 based on the value of a received control signal C via second dongle connector 491. In some embodiments, dongle module 442 may include variable resistance circuitry. In some embodiments, as shown, for example, dongle module 442 may be a constant current sink. As shown, such a constant current sink may include a first resistive element 443 (e.g., a resistor 444) biased by control signal C and a diode 445, which may form a shunt regular device, and an emitter follower 446 (e.g., a bipolar junction transistor 447) biased by the electric potential from control panel system 100 and a second resistive element 448 (e.g., a constant emitter resistor 449), which may form a common-collector amplifier. In some embodiments, as shown, these circuit elements may all be interconnected in such a way that the power pulled through dongle module 442 (e.g., the current Jo drawn through resistive element 448) may switch between a first amount when the value of control signal C applied to dongle module 442 is at a first value and a second amount when the value of control signal C applied to dongle module 442 is at a second value. For example, dongle module 442 may be configured to have dongle 400 pull 100 microamperes from control panel system 100 via first dongle connector 401 when sensor 202c is in a normal mode of operation and dongle module 442 receives a control signal C of a first value from pin 292c of advanced hazard detection device 200c via pin 492c of second dongle connector 491. For example, such a first value of control signal C may be 0 volts, which may disable the reference provided by control signal C to dangle module 442 and which may disable the sink of dongle module 442 such that dongle module 442 is in a first mode of operation. However, dongle module 442 may also be configured to have dongle 400 pull 50 milliamperes from control panel system 100 via first dongle connector 401 when sensor 202c is in an alarm mode of operation and dongle module 442 receives a control signal C of a second value from pin 292c of advanced hazard detection device 200c via pin 492c of second dongle connector 491. For example, such a second value of control signal C may be 1.8 volts, which may bias up the reference provided by control signal C to dongle module 442 and which may enable the sink of dongle module 442 such that dongle module 442 is in a second mode of operation.

Such an increase in the amount of power being pulled from one or both of wires 124c+ and 124c− of control panel system 100 by dongle 400 via first dongle connector 401 when dongle module 442 changes from its first mode of operation to its second mode of operation may be detected on first wired detection string 120a (e.g., via wired detection segments 122a-122c) by control panel 102 at one or both of terminals 112+ and 112− (e.g., using processor 110 of control panel 102). Therefore, control panel system 100 may provide all the power that dongle module 442 may need to function properly in each of its first and second modes of operation. Moreover, dongle module 442 may communicate which mode of operation it is in to control panel 102 by pulling different amounts of power from first wired detection string 120a. It is to be appreciated that the circuitry of dongle module 442 in its second mode of operation may be designed to pull 50 milliamperes from control panel system 100 regardless of the value of electric potential P, which may range from 6 volts (DC) to 33 volts (DC) in some embodiments. Therefore, it is to be appreciated that emitter follower 446 (e.g., bipolar junction transistor 447) of dongle module 442 may be selected to dissipate a certain maximum amount of power (e.g., to dissipate 1.65 watts when electric potential P is 33 volts and drawn current $I_O$ is 50 milliamperes).

Besides control signal C, one or more additional signals may be shared between pins 292 of device connector 291 and pins 492 of second dongle connector 491. For example, a ground pin 292d of advanced hazard detection device 200c may be electrically coupled to ground terminal G of dongle 400 via ground pin 492d of second dongle connector 491. Moreover, in order for advanced hazard detection device 200c to determine when it has been coupled to dongle 400, a device detect pin 292c of advanced hazard detection device 200c may be electrically coupled to dongle 400 via a dongle detect pin 492c of second dongle connector 491. While advanced hazard detection device 200c may be configured to detect an electric potential at device detect pin 292c when advanced hazard detection device 200c is not coupled to dongle 400, a wire 494 of dongle 400 may short dongle detect pin 492c to dongle ground pin 492d, such that device detect pin 292c may be grounded when coupled to dongle 400 and such that this grounding may be detected by advanced hazard detection device 200c to determine that it has been coupled to dongle 400.

Although advanced hazard detection device 200c may include its own power supply 208 and may not be powered by any power from control panel system 100, advanced hazard detection device 200c may be configured to sample the value of electric potential provided by control panel system 100 (e.g., to monitor whether control panel system 100 is functioning properly). For example, a system signal S that is related to the value of the electric potential (e.g., electric potential P) of control panel system 100 received at first dongle connector 401 of dongle 400 may be transmitted from pin 492a of second dongle connector 491 to pin 292a of device connector 291 of advanced hazard detection device 200c. System signal S may be equal to electric potential P, or electric potential P may be passed through a potential divider module 480 of dongle 400 that may divide down the value of electric potential P to a value for system signal S that may be handled by advanced hazard detection device 200c. For example, electric potential P may be equal to 33 volts but advanced hazard detection device 200c may be configured to receive system signal S with an A/D that is only 1.8 volts full scale, such that potential divider module 480 may generate a value for system signal S that is 5% of the value of electric potential P using two resistive elements 482 and 484 in series, as shown in FIG. 3.

Advanced hazard detection device 200c may then leverage one or more of its advanced capabilities to monitor the value of system signal S and to alert a user of hazard safety system 10 when this monitored signal becomes noteworthy. For example, processor 210 of advanced hazard detection device 200c may monitor the value of system signal S and determine that the value of electric potential provided by control panel system 100 is too low or even non-existent. In such an instance, processor 210 may instruct communications circuitry 204 of advanced hazard detection device 200c to notify a remote device or network of the status of control panel system 100. For example, communications circuitry 204 of advanced hazard detection system 200c may be configured to send such a status notification communication to a router 500 via a communications path 502 (e.g., via Wi-Fi), and router 500 may then provide that communication to the internet 600 via a communications path 504 (e.g., as shown in FIGS. 1-3). Alternatively, communications circuitry 204 of advanced hazard detection system 200c may be configured to send such a status notification communication directly to the internet 600 via a communications path 602. Communications circuitry 204 may be configured to use any suitable wired or wireless communication protocol for communicating with router 500 and/or internet 600, such as Wi-Fi (e.g., an 802.11 protocol), ZigBee an 802.15.4 protocol), Ethernet, Bluetooth™, Bluetooth™ Low Energy ("BLE"), high frequency systems (e.g., 900 MHz, 2.4 GHz, and 5.6 GHz communication systems), infrared, transmission control protocol/internet protocol ("TCP/IP") (e.g., any of the protocols used in each of the TCP/IP layers), hypertext transfer protocol ("HTTP"), BitTorrent™, file transfer protocol ("FTP"), real-time transport protocol ("RTP"), real-time streaming protocol ("RTSP"), secure shell protocol ("SSH"), any communications protocol that may be used by wireless and cellular telephones and personal e-mail devices (e.g., Global System for Mobile Communications ("GSM"), GSM plus Enhanced Data rates for GSM Evolution ("EDGE"), Code Division Multiple Access ("CDMA"), Orthogonal Frequency-Division Multiple Access ("OFDMA"), high speed packet access ("HSPA"), multi-band, etc.), any communications protocol that may be used by a low power Wireless Personal Area Network ("6LoW-PAN") module, any other communications protocol, or any combination thereof.

First dongle connector 401 for electrically coupling and connecting dongle 400 to control panel system 100 may be any suitable connector. For example, in some embodiments, first dongle connector 401 may include wire nuts, a terminal block, or any suitable other technique for coupling dongle 400 with wires 124c+ and 124c−. Moreover, second dongle connector 491 for electrically coupling and connecting dongle 400 to hazard detection device 200c may be any suitable connector. For example, in some embodiments, second dongle connector 491 may be keyed and may snap with device connector 291, which may also be keyed. Dongle 400 and hazard detection device 200c may be completely independent electronic devices, each of which may include its own circuit board that supports its own circuitry. In some embodiments, in order to protect dongle 400 from negative electrostatic discharge, one or more elements (e.g., a transient-voltage-suppression (TVS) diode) may be provided at one or more of the pins or terminals of first dongle connector 401 and/or second dongle connector 491.

In some embodiments, an end of the line component 700 may be provided as the last component along a wired detection string 120 (e.g., positioned along a wired detection string 120 after the after the last hazard detection device 200 or dongle 400). End of line component 700 may be operative to pull a fixed amount of current from a wired detection string 120 that may be detected by control panel 100 (e.g., when all of the other components along that string 120 are pulling very small amounts of current, such as when each of those components is in its normal mode of operation). For example, as shown in FIGS. 2 and 3, a final wired detection segment 122z of first wired detection string 120a may be electrically coupled to wired detection segment 122c such that electric potential P may be connected to component 700, such that component 700 may be configured to pull a certain amount of current therethrough. Particularly, as shown, a first end of each one of wires 124z+ and 124z− of wired detection segment 122z may be respectively coupled (e.g., shorted) to wires 124c+ and 124c− of wired detection segment 122*c* (e.g., by first dongle connector 401 of dongle 400), while a second end of each one of wires 124*z*+ and 124*z*− of wired detection segment 122*z* may be coupled to opposite terminals of component 700 (e.g., a resistor 702). In doing so, a certain amount of current may be pulled by component 700 that may be detected by terminals 112+ and 112− of control panel 102, at least under certain conditions, for determining a state of hazard safety system 10 (e.g., a state when all hazard detection devices 200 coupled to first wired detection string 120*a* are in their normal modes of operation).

In some embodiments, each wired detection string 120 may be a closed circuit when end of the line component 700 and each hazard detection device 200 and/or each dongle 400 is properly coupled to the detection string. For example, if module 400 or one of detection devices 200*a* or 200*b* were to be removed from string 120*a*, an open circuit would exist along string 120*a*. Control panel 102 may be configured to detect such an open circuit (e.g., at terminals 112+ and 112−) and may then provide an alert indicative of that fault condition. When one of detection device 200*a*, detection device 200*b*, or module 400 is coupled to string 120*a*, it may effectively short two sets of wires 124 of two consecutive wired detection segments 122 of string 120*a* (e.g., module 400 may effectively short wires 124*c*+ and 124*z*+ of consecutive segments 122*c* and 122*z*, as well as effectively short wires 124*c*− and 124*z*− of consecutive segments 122*c* and 122*z*). Thus, when each device 200 and module 400 is properly coupled to string 120*a*, yet are operating in normal modes that may draw very little power from control panel system 100, end of line component 700 may ensure that at least a specific amount of current above a specific threshold may be drawn from control panel 102 by string 120*a*. Therefore, control panel 102 may be configured to expect string 120*a* to draw only about this minimum amount of power when module 400 and each detection device 200 along string 120*a* is properly connected and operating in a normal mode. When any device along string 120*a* enters its alarm mode, control panel 102 may be configured to expect string 120*a* to draw a significantly greater amount of power (e.g., to draw significantly more current than end of line component 700).

Therefore, control panel 102 may work within a specific two-tiered power threshold framework and may only be configured to discern between two functional states of string 120*a*: (1) a low power threshold pull state during a normal mode of string 120*a* when each device along the string is in its normal mode (e.g., when a low threshold of current being drawn from end of line component 700 is the most current being drawn along the entirety of string 120*a*) and (2) a high power threshold pull state during an alarm mode of string 120*a* when a device along the string has entered an alarm mode (e.g., when a high threshold of power is being drawn by at least one device 200 or dongle 400 along string 120*a*). Therefore, dongle 400 may be necessary to allow certain devices 200, such as advanced device 200*c*, to work properly within this two-tiered power threshold framework of control panel 102. By interfacing with control panel system 100 via dongle 400, advanced device 200*c* may utilize a certain amount of power in its normal mode even when that amount of power is above the higher power threshold associated with the alarm mode of control panel 102. Dongle 400 may essentially hide the power requirements of the normal and alarm modes of interfaced device 200*c* from control panel system 100 while also enabling dongle 400 to properly communicate with control panel system 100 according to its specific two-tiered power threshold framework when interfaced device 200*c* changes modes.

Figure 4:
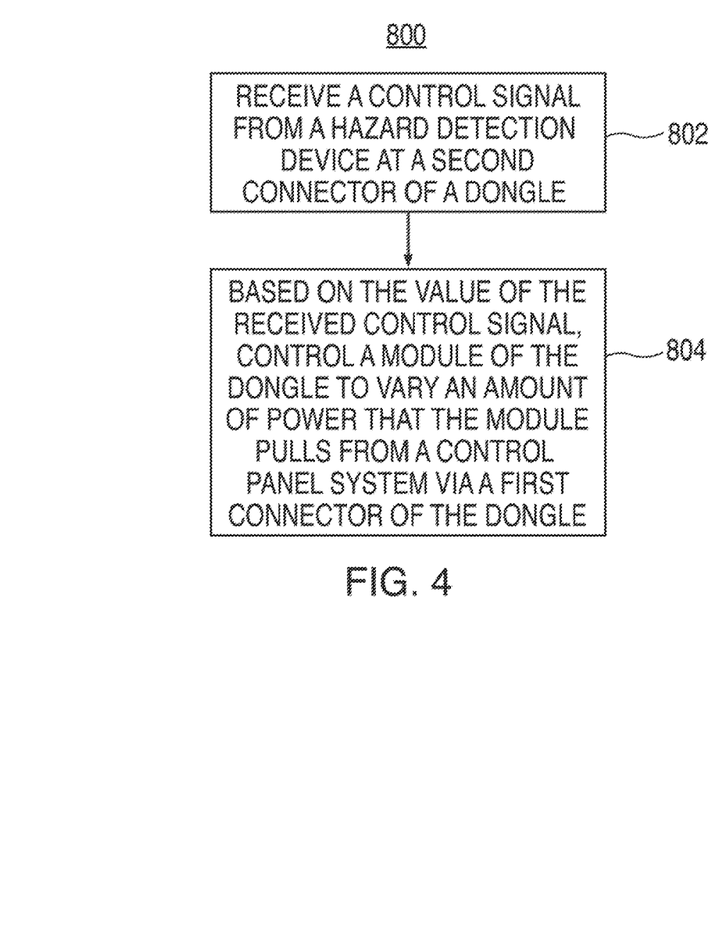
FIG. 4 is a flowchart of an illustrative process for operating a dongle, according to some embodiments.

FIG. 4 is a flowchart of an illustrative process 800 for operating a dongle that may include a first connector and a second connector. For example, as shown in FIGS. 2 and 3, dongle 400 may include first dongle connector 401, which may be coupled to wired detection string 120*a* of control panel system 100, and second dongle connector 491, which may be coupled to hazard detection device 200*c*. At step 802 of process 800, a control signal may be received from a hazard detection device at the second connector of the dongle. For example, as shown in FIGS. 2 and 3, control signal C may be received from hazard detection device 200*c* at second dongle connector 491 of dongle 400. Then, at step 804 of process 800, based on the value of the received control signal, a module of the dongle may be controlled to vary an amount of power that the module may pull from a control panel system via the first connector of the dongle. For example, as described above with respect to FIGS. 2 and 3, based on the value of control signal C received at second dongle connector 491, dongle module 442 may be enabled or disabled for pulling different amounts of power from control panel system 100 via first dongle connector 401 of dongle 400.

It is to be understood that the steps shown in process 800 of FIG. 4 are merely illustrative and that additional steps may be added, the ordering of steps may be changed, and existing steps may be omitted or modified.

Figure 5:
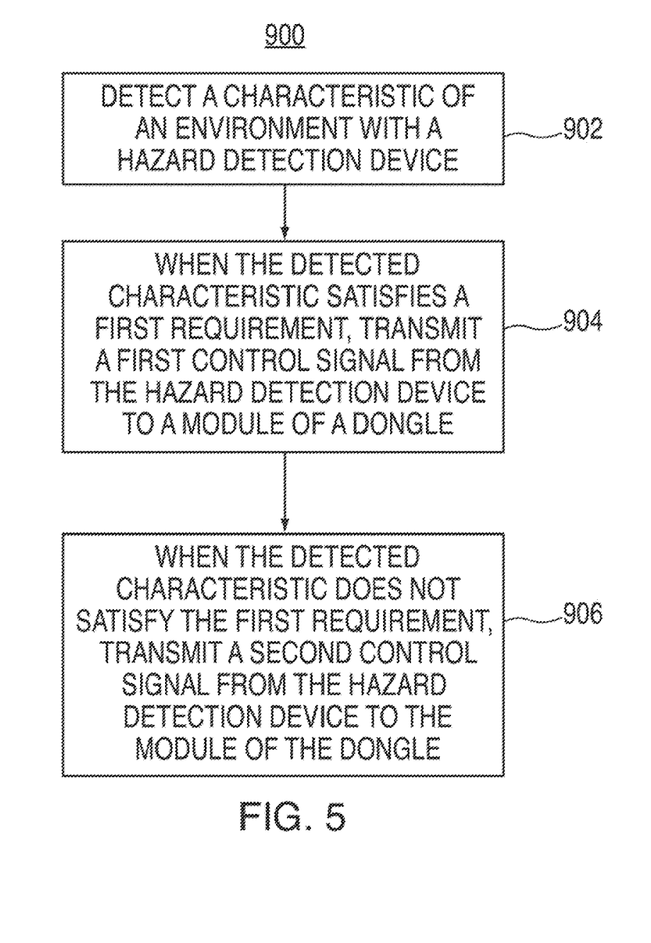
FIG. 5 is a flowchart of an illustrative process for operating a hazard detection device, according to some embodiments.

FIG. 5 is a flowchart of an illustrative process 900 for operating a hazard detection device. At step 902 of process 900, a characteristic of an environment may be detected with the hazard detection device. For example, as described above with respect to FIGS. 1-3, sensor 202*c* of hazard detection device 200*c* may detect an amount of smoke in an environment of enclosure 1. Next, at step 904 of process 900, a first control signal may be transmitted from the hazard detection device to a module of a dongle when the detected characteristic satisfies a first requirement. For example, as described above with respect to FIGS. 2 and 3, a control signal C of a first value may be transmitted from hazard detection device 200*c* to dongle module 442 of dongle 400 when an amount of smoke detected by sensor 202*c* is below a threshold amount (e.g., when hazard detection device 200*c* is in a normal mode of operation). Next, at step 906 of process 900, a second control signal may be transmitted from the hazard detection device to the module of the dongle when the detected characteristic does not satisfy a first requirement. For example, as described above with respect to FIGS. 2 and 3, a control signal C of a second value may be transmitted from hazard detection device 200*c* to dongle module 442 of dongle 400 when an amount of smoke detected by sensor 202*c* is above a threshold amount (e.g., when hazard detection device 200*c* is in an alarm mode of operation).

It is to be understood that the steps shown in process 900 of FIG. 5 are merely illustrative and that additional steps may be added, the ordering of steps may be changed, and existing steps may be omitted or modified. For example, in some embodiments, the step of transmitting a second control signal (e.g., step 906) can be performed before the step of transmitting a first control signal (e.g., step 904).

It is understood that although the embodiments are described herein with respect to a hazard detection system, these embodiments may also be used in any system or device where it is desired to maintain sensing and monitoring of other events while updating the operational capabilities of one of more components of that system or device. For example, the other events can include events that are not necessarily tied to hazards such as smoke, CO, and heat, but can include motion detection, sound detection, and the like. Events reported by remote devices may also be taken into account. For example, security device such as window and door sensor, and motion detection sensors that provide feedback to a system may quality as other events.

Any processes described with respect to FIGS. 1-5, as well as any other aspects of the invention, may each be implemented by software, but may also be implemented in hardware, firmware, or any combination of software, hardware, and firmware. They each may also be embodied as machine- or computer-readable code recorded on a machine- or computer-readable medium. The computer-readable medium may be any data storage device that can store data or instructions which can thereafter be read by a computer system. Examples of the computer-readable medium may include, but are not limited to, read-only memory, random-access memory, flash memory, CD-ROMs, DVDs, magnetic tape, and optical data storage devices. The computer-readable medium can also be distributed over network-coupled computer systems so that the computer readable code is stored and executed in a distributed fashion. For example, the computer-readable medium may be communicated from one electronic subsystem or device to another electronic subsystem or device using any suitable communications protocol. The computer-readable medium may embody computer-readable code, instructions, data structures, program modules, or other data in a modulated data signal, such as a carrier wave or other transport mechanism, and may include any information delivery media. A modulated data signal may be a signal that has one or more of its characteristics set or changed in such a manner as to encode information in the signal.

It is to be understood that any or each module or state machine discussed herein may be provided as a software construct, firmware construct, one or more hardware components, or a combination thereof. For example, any one or more of the state machines or modules may be described in the general context of computer-executable instructions, such as program modules, that may be executed by one or more computers or other devices. Generally, a program module may include one or more routines, programs, objects, components, and/or data structures that may perform one or more particular tasks or that may implement one or more particular abstract data types. It is also to be understood that the number, configuration, functionality, and interconnection of the modules or state machines are merely illustrative, and that the number, configuration, functionality, and interconnection of existing modules may be modified or omitted, additional modules may be added, and the interconnection of certain modules may be altered.

Whereas many alterations and modifications of the present invention will no doubt become apparent to a person of ordinary skill in the art after having read the foregoing description, it is to be understood that the particular embodiments shown and described by way of illustration are in no way intended to be considered limiting. Therefore, reference to the details of the preferred embodiments is not intended to limit their scope.

What is claimed is:

1. A dongle for interfacing a control panel system with a hazard detection device, the control panel system comprising a control panel and at least one wired detection string, wherein the control panel monitors a current level provided to each wired detection string to determine whether an alarm condition exists on the at least one wired detection string, and wherein the hazard detection device would cause a false alarm condition to exist for the wired detection string if it were directly electrically coupled to that wired detection string, the dongle comprising:
   a first connector configured to be electrically coupled to a wired detection string of the control panel system;
   a second connector configured to be electrically coupled to the hazard detection device; and
   a first module configured to:
      receive a control signal from the hazard detection device via the second connector;
      pull a first amount of current from the control panel system via the first connector when the received control signal is a first value, the first amount of current having a current level that does not indicate an alarm condition exists on the wired detection string; and
      pull a second amount of current from the control panel system via the first connector when the received control signal is a second value, the second amount of current having a current level that does indicate an alarm condition exists on the wired detection string.

2. The dongle of claim 1, wherein the first module comprises variable resistance circuitry.

3. The dongle of claim 1, wherein the first module comprises a constant current sink.

4. The dongle of claim 1, wherein:
   the first connector is configured to be electrically coupled to at least a first wire of the wired detection string; and
   regardless of the value of an electric potential at the first wire, the first module is configured to pull the same second amount of current from the first wire when the received control signal is the second value.

5. The dongle of claim 1, wherein:
   the first connector is configured to be electrically coupled to a plurality of wires of the wired detection string; and
   the dongle further comprises a second module that is configured to enable the first connector to be coupled to the plurality of wires in a plurality of ways while still enabling proper function of the first module.

6. The dongle of claim 5, wherein the second module is a full diode bridge.

7. The dongle of claim 1, wherein:
   the first connector is configured to be electrically coupled to a plurality of wires of the wired detection string;
   the plurality of wires comprises a first wire and a second wire;
   the first wire comprises a first electric potential;
   the second wire comprises a second electric potential that is less than the first electric potential;
   the first connector comprises a first pin and a second pin;
   the dongle further comprises a second module;
   the second module comprises a first node electrically coupled to the first pin, a second node electrically coupled to the second pin, and a third node; and
   the second module is configured to provide at the third node the difference between the electric potential of the first node and the electric potential of the second node with a constant polarity regardless of which one of the following is true:
      the first wire is electrically coupled to the first pin and the second wire is electrically coupled to the second pin; and
      the first wire is electrically coupled to the second pin and the second wire is electrically coupled to the first pin.

8. The dongle of claim 7, wherein the third node is electrically coupled to the first module.

9. The dongle of claim 1, wherein the first connector is configured to close a circuit path within the wired detection string when it is connected to the wired detection string.

10. The dongle of claim 1, wherein the first connector is configured to be electrically coupled to a plurality of wire segments of the wired detection string, and wherein the first connector is configured to short circuit at least one pair of the wire segments together.

11. The dongle of claim 1, wherein:
the first module is configured to receive the control signal from the hazard detection device via a first pin of the second connector;
the first connector is configured to be electrically coupled to at least a first wire of the control panel system; and
the dongle is configured to provide a value related to the electric potential of the first wire to the hazard detection device via a second pin of the second connector.

12. The dongle of claim 11, wherein the provided value does not power the hazard detection device.

13. A hazard detection device for interfacing with a dongle, the hazard detection device comprising:
a sensor configured to detect a characteristic of an environment;
a processor configured to process the detected characteristic;
a power supply configured to power at least one of the sensor and the processor; and
a device connector configured to be electrically coupled to a dongle connector of the dongle, wherein:
the device connector comprises a first device pin configured to be electrically coupled to a first dongle pin of the dongle connector;
the processor is further configured to transmit a first control signal to the first device pin when the processor determines that the detected characteristic satisfies a first requirement; and
the processor is further configured to transmit a second control signal to the first device pin when the processor determines that the detected characteristic does not satisfy the first requirement.

14. The hazard detection device of claim 13, wherein:
the dongle is configured to interface with a control panel system;
the first control signal is configured to enable the dongle via the first dongle pin to pull a first amount of power from the control panel system; and
the second control signal is configured to enable the dongle via the first dongle pin to pull a second amount of power from the control panel system.

15. The hazard detection device of claim 13, wherein:
the dongle is configured to interface with a control panel system;
the device connector comprises a second device pin configured to be electrically coupled to a second dongle pin of the dongle connector; and
the second device pin is configured to receive a value related to an electric potential of the control panel system via the second dongle pin.

16. The hazard detection device of claim 15, wherein the received value does not power any component of the hazard detection device.

17. The hazard detection device of claim 15, further comprising communications circuitry configured to communicate with a remote device, wherein the processor is further configured to instruct the communications circuitry to communicate with the remote device when the received value falls below a threshold.

18. A hazard safety system comprising:
a control panel system comprising:
a control panel; and
a plurality of wires electrically coupled to the control panel;
a first hazard detection device, wherein the first hazard detection device is not powered by the control panel system; and
a dongle comprising:
a first dongle connector electrically coupled to at least a first wire of the plurality of wires;
a second dongle connector electrically coupled to at least a first pin of the first hazard detection device; and
a dongle module configured to:
receive a control signal from the first hazard detection device via the second dongle connector; and
based on a value of the received control signal, vary an amount of power that the dongle module pulls from the first wire via the first dongle connector.

19. The hazard safety system of claim 18, further comprising a second hazard detection device electrically coupled to at least one of the plurality of wires, wherein the second hazard detection device is powered by the control panel system.

20. A method for operating a dongle that comprises a first connector and a second connector, the method comprising:
receiving a control signal from a hazard detection device at the second connector of the dongle;
based on the value of the received control signal, controlling a module of the dongle to vary an amount of power that the module pulls from a control panel system via the first connector of the dongle; and
varying the value of the control signal based on a characteristic of an environment detected by the hazard detection device.

21. The method of claim 20, further comprising powering the hazard detection device without any power from the control panel system.

22. The method of claim 20, wherein the module comprises a constant current sink.

23. The method of claim 20, wherein:
when the value of the received control signal is a first value, the controlling the module comprises controlling the module to pull a first amount of power that is below a first threshold; and
when the value of the received control signal is a second value, the controlling the module comprises controlling the module to pull a second amount of power that is above the first threshold.

24. The method of claim 20, wherein:
when the value of the received control signal is a first value, the controlling the module comprises controlling the module to pull a first amount of power that is below a first threshold; and
when the value of the received control signal is a second value, the controlling the module comprises controlling the module to pull a second amount of power that is above a second threshold.

25. The method of claim 24, wherein:
the first amount of power is 100 microamperes; and
the second amount of power is 50 milliamperes.

26. The method of claim 20, further comprising receiving an electric potential of the control panel system at the first connector, wherein the amount of power that the module pulls from the control panel system is independent of the value of the received electric potential.

27. The method of claim 20, further comprising:
receiving an electric potential of the control panel system at the first connector;
transmitting a system signal that is related to the value of the electric potential to the hazard detection device from the dongle via the second connector; and
based on the value of the transmitted system signal, controlling a communication between the hazard detection device and a remote device.

28. The method of claim 27, wherein the value of the transmitted system signal is one of the value of the electric potential and a fraction of the value of the electric potential.

29. The method of claim 27, further comprising powering the hazard detection device without use of the system signal.

30. A method for operating a hazard detection device, the method comprising:
detecting a characteristic of an environment with the hazard detection device;
when the detected characteristic satisfies a first requirement, transmitting a first control signal from the hazard detection device to a module of a dongle; and
when the detected characteristic does not satisfy the first requirement, transmitting a second control signal from the hazard detection device to the module of the dongle, wherein:
the first control signal is configured to enable the module of the dongle to draw a first amount of power that is below a first threshold from a control panel system; and
the second control signal is configured to enable the module of the dongle to draw a second amount of power that is above a second threshold from the control panel system.

31. The method of claim 30, wherein:
the first amount of power is 100 microamperes; and
the second amount of power is 50 milliamperes.

32. A method for operating a dongle that comprises a first connector and a second connector, the method comprising:
receiving a control signal from a hazard detection device at the second connector of the dongle;
based on the value of the received control signal, controlling a module of the dongle to vary an amount of power that the module pulls from a control panel system via the first connector of the dongle; and
powering the hazard detection device without any power from the control panel system.

33. The method of claim 32, further comprising varying the value of the control signal based on a characteristic of an environment detected by the hazard detection device.

34. The method of claim 32, wherein the module comprises a constant current sink.

35. The method of claim 32, wherein:
when the value of the received control signal is a first value, the controlling the module comprises controlling the module to pull a first amount of power that is below a first threshold; and
when the value of the received control signal is a second value, the controlling the module comprises controlling the module to pull a second amount of power that is above the first threshold.

36. The method of claim 32, wherein:
when the value of the received control signal is a first value, the controlling the module comprises controlling the module to pull a first amount of power that is below a first threshold; and
when the value of the received control signal is a second value, the controlling the module comprises controlling the module to pull a second amount of power that is above a second threshold.

37. The method of claim 32, further comprising receiving an electric potential of the control panel system at the first connector, wherein the amount of power that the module pulls from the control panel system is independent of the value of the received electric potential.

38. A method for operating a dongle that comprises a first connector and a second connector, the method comprising:
receiving a control signal from a hazard detection device at the second connector of the dongle; and
based on the value of the received control signal, controlling a module of the dongle to vary an amount of power that the module pulls from a control panel system via the first connector of the dongle, wherein:
when the value of the received control signal is a first value, the controlling the module comprises controlling the module to pull a first amount of power that is below a first threshold; and
when the value of the received control signal is a second value, the controlling the module comprises controlling the module to pull a second amount of power that is above a second threshold.

39. The method of claim 38, further comprising varying the value of the control signal based on a characteristic of an environment detected by the hazard detection device.

40. The method of claim 38, further comprising powering the hazard detection device without any power from the control panel system.

41. The method of claim 38, wherein the module comprises a constant current sink.

42. The method of claim 38, wherein:
when the value of the received control signal is a first value, the controlling the module comprises controlling the module to pull a first amount of power that is below a first threshold; and
when the value of the received control signal is a second value, the controlling the module comprises controlling the module to pull a second amount of power that is above the first threshold.

43. The method of claim 38, further comprising receiving an electric potential of the control panel system at the first connector, wherein the amount of power that the module pulls from the control panel system is independent of the value of the received electric potential.

* * * * *